US009060207B2

(12) United States Patent
Scherkus et al.

(10) Patent No.: US 9,060,207 B2
(45) Date of Patent: Jun. 16, 2015

(54) ADAPTIVE VIDEO STREAMING OVER A CONTENT DELIVERY NETWORK (75) Inventors: Andrew Scherkus, Seattle, WA (US); Aaron James Colwell, Seattle, WA (US)

(73) Assignee: Google Inc., Mountain View, CA (US)

(*) Notice: Subject to any disclaimer, the term of this patent is extended or adjusted under 35 U.S.C. 154(b) by 213 days.

(21) Appl. No.: 13/589,706

(22) Filed: Aug. 20, 2012

(65) Prior Publication Data
US 2014/0052846 A1 Feb. 20, 2014

(51) Int. Cl.
G06F 15/173 (2006.01)
H04N 21/658 (2011.01)
H04N 21/442 (2011.01)
H04N 21/845 (2011.01)

(52) U.S. Cl.
CPC ..... H04N 21/6581 (2013.01); H04N 21/44209 (2013.01); H04N 21/8456 (2013.01)

(58) Field of Classification Search
USPC .................................................. 709/217, 224
See application file for complete search history.

(56) References Cited

U.S. PATENT DOCUMENTS

| 6,771,703 B1* | 8/2004 | Oguz et al. | 375/240.03 |
| 2012/0311174 A1* | 12/2012 | Bichot et al. | 709/231 |
| 2013/0138828 A1* | 5/2013 | Strasman et al. | 709/231 |

OTHER PUBLICATIONS

Google Inc., "The Chromium Projects—SPDY: An experimental protocol for a faster web," Nov. 11, 2009, 4 pages, [online] [retrieved on Jan. 11, 2013] Retrieved from the internet <URL: https://sites.google.com/a/chromium.org/dev/spdy/spdy-whitepaper>.
YouTube, Inc., "Most Subscribed Channels (All Time)," Archived on Web.archive.org on Sep. 3, 2006, 1 Page [online] [retrieved on May 7, 2013] Retrieved from the internet <URL:http://web.archive.org/web/20060903035149/http://www.youtube.com/members?s=ms&t=a&g=0>.

* cited by examiner

Primary Examiner — Joseph E Avellino
Assistant Examiner — Marshall McLeod
(74) Attorney, Agent, or Firm — Fenwick & West LLP (57) ABSTRACT A system and method provides adaptively streaming a video over a content delivery network. A client sends a streaming request for a first portion of the video to a computer server, where the video has multiple video chunks, and each video chunk has one or more streaming parameters (e.g., priority and bitrate). The computer server retrieves the requested portion of the video and streams the first portion of the video over a content delivery network. The client monitors the video chunks received from the computer server and determines the video quality of the next portion of the video based on the monitoring. Responsive to the condition of the content delivery network being able to support streaming the next portion of the video with higher quality, the client updates the default video quality and requests the next portion of the video with the updated default video quality.

15 Claims, 5 Drawing Sheets

ADAPTIVE VIDEO STREAMING OVER A CONTENT DELIVERY NETWORK

BACKGROUND

Described embodiments relate generally to web-based video streaming and specifically to adaptive video streaming over a content delivery network using fast network protocols.

Networked video streaming provides users with rich opportunities to upload, watch and share videos in fast-growing online video entertainment communities. Video streaming sites such as YOUTUBE™ allow content providers to upload videos and download videos from the video streaming sites. Users can easily share videos by mailing links to others, or embedding them on web pages or in blogs. Users can also rate and comment on videos, bringing new social aspects to video viewing.

Videos have various video quality levels, for example including low, medium and high. Video quality is one characteristic of a video passed through a video processing/transmission system and is often measured by the perceived degradation compared to the original video. Streaming a high quality video generally requires a high bitrate, high resolution and high requirement for network bandwidth to support video streaming.

It is challenging to stream a high quality video over a content delivery network (e.g., the Internet) with acceptable delay using existing network protocols for the web. For example, the existing network protocols Hpertext Transfer Protocol (HTTP) and Transmission Control Protocol (TCP) are not particularly designed to be latency sensitive. Because HTTP can only fetch one video resource at a time, a server delay of 500 milliseconds prevents reuse of a TCP channel for additional streaming requests. Recently improved network protocols, such as SPDY protocol, allow concurrent HTTP requests to run across a single TCP session for a variety of content delivery applications. Thus, there is a need for adaptive video streaming over a content delivery network using fast network protocols

SUMMARY

A method, system and computer program product provides adaptive video streaming over a video content delivery network using fast network protocols.

In one embodiment, a computer method is provided for adaptively streaming a video over a content delivery network. A client requests a first portion of the video from a computer server, where the video has multiple video chunks, and each video chunk has one or more streaming parameters (e.g., priority and bitrate). The computer server retrieves the requested portion of the video and streams the video over the content delivery network. The method monitors the video chunks received from the computer server and determines the video quality of the next portion of the video to be streamed based on the monitoring. Responsive to the condition of the content delivery network being able to support streaming the next portion of the video with higher quality, the method updates the default video quality and requests the next portion of the video with the updated default video quality.

Another embodiment includes a system for adaptive video streaming over a video content delivery network using fast network protocols. A further embodiment includes a non-transitory computer-readable medium that stores executable computer program instructions for adaptive video streaming over a video content delivery network using fast network protocols in the manner described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

It is to be understood that the Figures and descriptions of the invention have been simplified to illustrate elements that are relevant for a clear understanding of the embodiments of the invention, while eliminating, for the purpose of clarity, many other elements found in a typical web-based video player and method of using the same. Those of ordinary skill in the art may recognize that other elements and/or steps are desirable and/or required in implementing the invention. However, because such elements and steps are well known in the art, and because they do not facilitate a better understanding of the invention, a discussion of such elements and steps is not provided herein. The disclosure herein is directed to all such variations and modifications to such elements and methods known to those skilled in the art.

Figure 1:
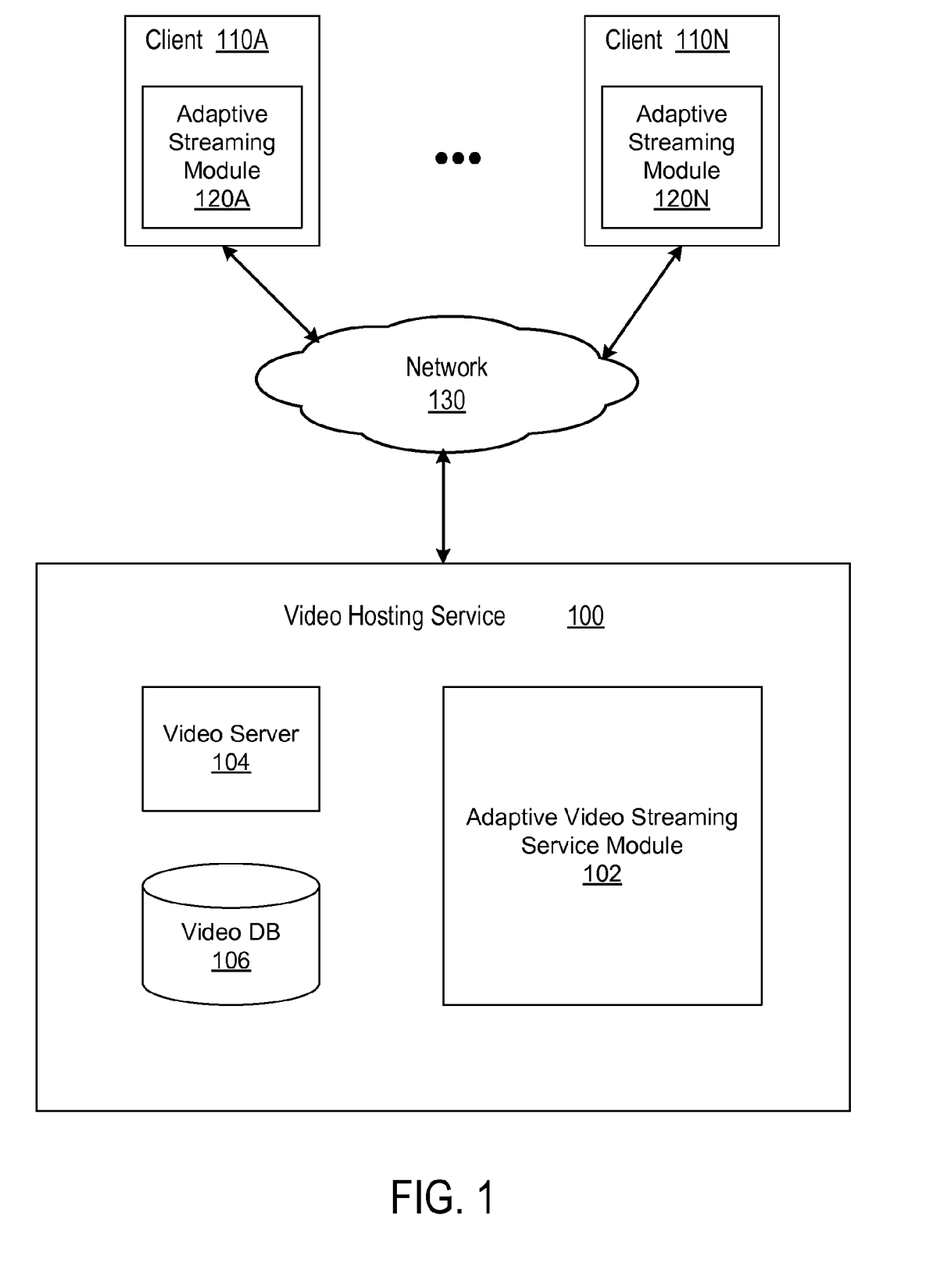
FIG. 1 is a block diagram of a video hosting service configured to provide adaptive video streaming services to clients.

FIG. 1 is a block diagram of a video hosting service 100 configured to provide adaptive video streaming services to clients 110. Multiple users/viewers use clients 110A-N to send videos to the video hosting service 100, and receive various services from the video hosting service 100, including adaptive video streaming. Each client 110 executes an adaptive streaming module 120 for requesting and receiving adaptive video streaming service. The video hosting service 100 communicates with one or more clients 110A-N via a network 130. In response to clients' video streaming requests, the video hosting service 100 provides the requested adaptive video streaming service using an adaptive video streaming service module 102 to the clients 110A-N.

Turning to the individual entities illustrated on FIG. 1, a user uses a client 110 for services provided by the video hosting service 100. For example, a user uses a client 110 to upload videos or groups of videos, to request streaming a video with adaptive bitrates. The client 110 can be any type of computer device, such as a personal computer (e.g., desktop, notebook, laptop computer), as well as devices such as a mobile telephone or personal digital assistant that has the capability to record video content. The client 110 typically includes a processor, a display device (or output to a display device), a local storage, such as a hard drive or flash memory device, to which the client 110 stores data used by the user in performing tasks, and a network interface for coupling to the video hosting services 100 via the network 130.

The network 130 enables communications between the clients 110 and the video hosting service 100. In one embodiment, the network 130 is the Internet, and uses standardized internetworking communications technologies and protocols, known now or subsequently developed that enable the clients 110 to communicate with the video hosting service 100. In another embodiment, the network 130 is a cloud computing network and includes one or more components of the video hosting service 100.

In one embodiment, the network 130 uses a fast network protocol, such as SPDY protocol, for video content delivering. Compared with traditional TCP/IP and HTTP protocols, SPDY protocol supports multiplexed video streams and service request prioritization. To support multiplexed video streams, SPDY protocol allows for multiple concurrent video streams over a single TCP connection. Because TCP requests with SPDY protocol are interleaved on a single channel, the efficiency of TCP is much higher than traditional TCP protocol. In other words, fewer network connections need to be made, and fewer but more densely packed data packets are issued.

SPDY protocol also supports service request prioritization. A client can send many service requests to a computer server (e.g., the video server 104 of FIG. 1) for content delivery services, and assign a priority to each service request. Prioritizing service requests in this way prevents the network channel from being congested with non-critical resources when a high priority request is pending. The application of SPDY is further described with reference to the adaptive streaming module 120 of the client 110 and the adaptive video streaming service module 102 below.

The video hosting service 100 comprises an adaptive video streaming service module 102, a video server 104, and a video database 106. The video server 102 receives and dispatches videos including videos with adaptive bitrates (e.g., videos modified by the adaptive video streaming service module 102). The video database 106 stores videos with various video qualities (e.g., low or high video quality). Other embodiments of the video hosting service 100 may include other and/or different computer modules.

Video quality is one characteristic of a video and can be measured by one or more parameters, including bitrate (e.g., bits per second), network bandwidth required to stream the video, video compression ratio, etc. When streaming a video from a video server (e.g., the video server 104) to a client, the quality of the video also depends on whether the speed to download the requested video can be supported by a download rate (e.g., bits per second) of the requested video from the video server. For example, if the speed to download a portion of the requested video with a low bitrate is at a download rate that can support streaming the video with a higher bitrate (i.e., higher quality), the subsequent portion of the requested video can be streamed with a higher quality in terms of the higher bitrate than the one for the current portion.

In one embodiment, the unit for a portion of video data is a video chunk. A video chunk is identified by a unique chunk identification (e.g., vc_id_1) among other portions of the same video. A video chunk can also be globally unique from other videos. A video generally has a sequence of video chunks. A video can be divided into a sequence of video chunks in a variety of ways. In one embodiment, a video can have a sequence of fixed sized video chunks. For example, every 15 seconds of a video form a video chunk. A fixed sized video chunk can also be measured in terms of number of video frames. For example, every 100 frames of a video form a video chunk.

In another embodiment, a video has variable sized video chunks, for example, based on the variation and complexity of motion in the video. For example, assume the first 5 seconds of the video contain complex video data (e.g., a football match) and the subsequent 20 seconds of the video are simple and static scenes (e.g., green grass of the football field). The first 5 seconds of the video form a first video chunk and the subsequent 20 seconds of the video make a second video chunk. In this manner, the latency associated with streaming the videos can be reduced.

The adaptive video streaming service module 102 receives a request for streaming a video comprising one or more video chunks and streaming parameters associated with each video chunk from a client 110, and returns the video chunks with the requested video quality to the client 110. In one embodiment, the streaming parameters of a video chunk include an indication of the quality (in terms of bitrate) of the video chunk, priority information of the video chunk and/or current download rate of the video chunk at the client 110. The streaming parameters associated with video chunks of a video determine the quality and orders of the video chunks to be streamed from the video server 104. For example, a video chunk with a higher priority is to be played back sooner by the client 110 than another video chunk with a lower priority.

The adaptive video streaming service module 102 uses the streaming parameters associated with the video chunks of a video to adaptively stream the video. For example, the adaptive video streaming service module 102 streams the video chunks of the video in order based on the priority information associated with the video chunks. The prioritized video chunks are transported to the clients 110 for playing back via the network 130, which supports the prioritized video streaming by SPDY network protocol.

The adaptive video streaming service module 102 may use the streaming parameters associated with each video chunk from the client 110 to stream multiple video chunks concurrently to the client 110. For example, if the bitrate and current download rate associated with the video chunks indicate that current download rate at the client 110 supports multiple video chunks downloading, the adaptive video streaming service module 102 fetches the multiple video chunks identified by the streaming parameters and streams the video chunks to the clients 110 for playing back via the network 130, which supports multiplexed video streaming by SPDY network protocol.

Figure 2:
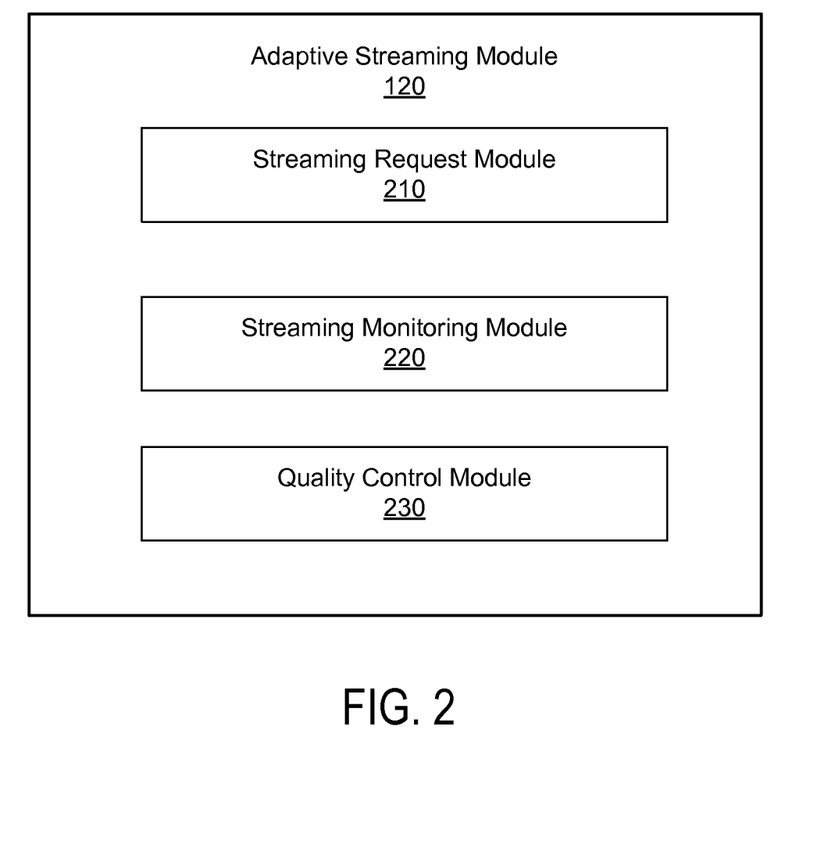
FIG. 2 is a block diagram of an adaptive streaming module at clients to process adaptive video streaming requests.

FIG. 2 is a block diagram of an adaptive streaming module 120 executed at a client 110 to process adaptive video streaming requests. The adaptive streaming module 120 sends video streaming requests to the video hosting service 100 and monitors the video quality and current download rate of each requested portion of video data (e.g., video chunks). Based on the monitoring result, the adaptive streaming module 120 updates the streaming parameters associated with the next portion of the video data. In the embodiment illustrated in FIG. 2, the adaptive streaming module 120 includes a streaming request module 210, a streaming monitoring module 220 and a quality control module 230. Other embodiment may include different modules and/or different numbers of modules.

The streaming request module 210 is adapted to send prioritized video streaming requests to the video hosting service 100. In one embodiment, the streaming request module 210 assigns a priority to each video streaming request. Each video streaming request identifies a portion of the video to be streamed (e.g., 15 seconds of the video, or the first five video chunks of the video). The video data (e.g., video chunks) in a video streaming request may share the same priority. The priority assigned to each request can be in a binary value, for example, 0 representing high priority and 1 for low priority. Other embodiments may use other types of values (e.g., incremental numeric values) to represent priorities of video streaming requests.

The streaming request module 210 is also adapted to dynamically assign a bitrate to each video streaming request. In one embodiment, the bitrate is simplified to be either high or low, where a high bitrate represents high video quality and low bitrate represents low video quality. For example, a video chunk with a high priority and low bitrate of the first video streaming request can be represented as a triplet (reg1, 0, low). By default, the streaming request module 210 assigns a high priority and low bitrate for the first video streaming request of a video. Responsive to the current download rate for the first video streaming request supports a higher bitrate video streaming, the streaming request module 210 assigns a higher bitrate for a subsequent video streaming request.

Figure 4:
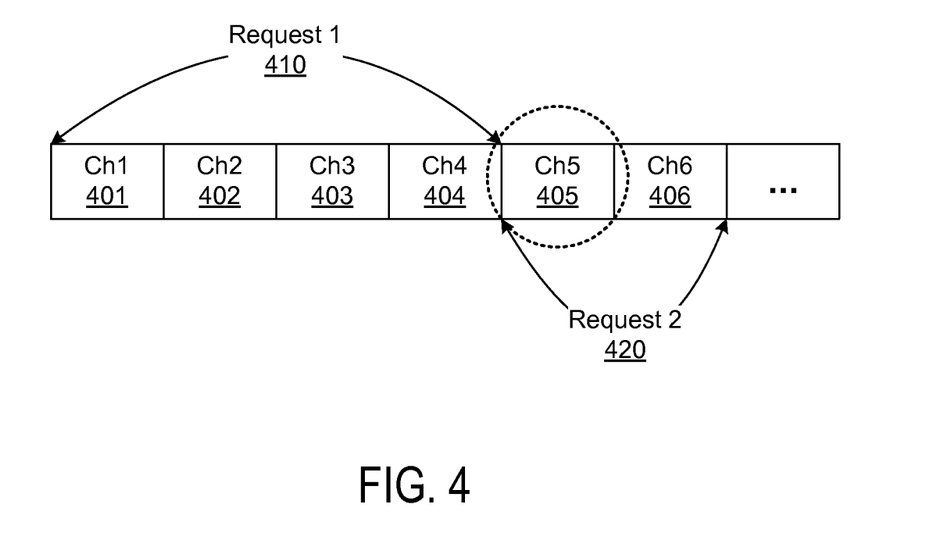
FIG. 4 is an example of prioritizing video chunks of a video file for adaptive video streaming.

FIG. 4 is an example to further illustrate video stream request prioritizing for adaptive video streaming. The example in FIG. 4 shows a video comprising at least six video chunks (e.g., 401-406). Assume that the first 4 video chunks (e.g., 401-404) form a first video streaming request 410, and that the next two video chunks (e.g., 405-406) are included in a second video streaming request 420. The streaming request module 210 assigns a high priority (i.e., priority 0) and low bitrate to the first video streaming request 410 and assigns a low priority and high bitrate to the second video streaming request 420 based on an assumption that higher quality video streaming can be supported at certain point during the streaming of the video. The example illustrated in FIG. 4 is further described below.

The streaming monitoring module 220 monitors the download rate for each video streaming request and determines whether a higher bitrate for a subsequent video chunk can be supported by the current download rate. The download rate of a video chunk indicates the condition of the network between the client 110 and the video hosting service 100 when the video chunk is streamed. Additionally, the download rate for a video chunk can also indicate whether the condition of the network between the client 110 and the video hosting service 100 can support streaming subsequent portions of the video data with a higher bitrate. For example, if the download rate (e.g., bits per second) for the current video chunk is much higher than a pre-determined download rate threshold value, it indicates the network 130 between the client 110 and the video hosing service 100 is not congested and the network 130 may have enough network bandwidth to support streaming a subsequent video chunk (not necessarily next video chunk, but a video chunk to be downloaded at some point in the future) with a higher bitrate/quality.

The streaming monitoring module 220 determines whether a higher bitrate for a subsequent video chunk can be supported by the current download rate. In one embodiment, the streaming monitoring module 220 determines whether the current download rate supports a higher bitrate video streaming by comparing the current download rate with a predetermined performance threshold value (e.g., a threshold download rate). If the download rate of the current video chunk is higher than the performance threshold value, the streaming monitoring module 220 determines that a higher bitrate for a subsequent video chunk can be supported by the current download rate. The streaming monitoring module 220 sets the bitrate of current video chunk as the default bitrate for the subsequent video chunk and communicates the monitoring result with the streaming request module 210 and the quality control module 230. The streaming request module 210, in turn, updates the bitrate of the subsequent video chunk, and the quality control module 230 starts downloading the subsequent video chunk with a higher bitrate.

For example, if the threshold download rate is 500 kps and the download rate for the current video chunk is 1000 kps, the streaming monitoring module 220 determines that a higher bitrate for a subsequent video can be supported by the current download rate 1000 kbps. The streaming monitoring module 220 sets the current download rate 1000 kbps as the default bitrate for the subsequent video chunk. In a scenario of fetching multiple video chunks in parallel using request prioritization with SPDY, the streaming monitoring module 220 can set a higher performance threshold value than the one for single video chunk fetching.

The quality control module 230 interacts with the streaming request module 210 and the streaming monitoring module 220 to adaptive download the video chunks of a video at the bitrates supported by download rate of the video. For example, the quality control module 230 obtains the priority and bitrate associated with each video chunk from the streaming request module 220 and starts downloading the video chunks in order based on the priority of the video chunks. Responsive to an indication that the download rate for the current video chunk supports a higher bitrate and/or concurrent downloading of multiple video streaming requests, the quality control module 230 downloads the video chunks of the identified video streaming requests in parallel at their specified bitrates. Responsive to detection from the streaming monitoring module 220 that the downloading of the subsequent video chunk with the higher bitrate is below a performance threshold value (e.g., a threshold download rate with acceptable streaming latency), the quality control module 230 stops the downloading of the subsequent video chunks with the higher bitrate and restarts downloading the subsequent video chunks with a lower bitrate as soon as possible so that the client 110 will not suffer from video streaming jittering. In one embodiment, the quality control module 230 uses the cancellation feature of SPDY to stop downloading a video chunk with a bitrate not supported by the current download rate.

Referring back to the example of FIG. 4, assuming that video chunk 401 is the current video chunk being streamed and video chunk 401 has a high priority and low bitrate, and video chunk 405 is a subsequent video chunk to be streamed in the future. The video chunk 401 has a high priority and low bitrate because it is the first video chunk of the video to be streamed and there is not enough information about network condition that guarantees the streaming of the first video chunk within acceptable delay. By default, the streaming request module 210 assigns a higher bitrate but lower priority to video chunk 405 based on an assumption that the download rate can support the higher bitrate of video chunk 405 in the future.

Figure 3:
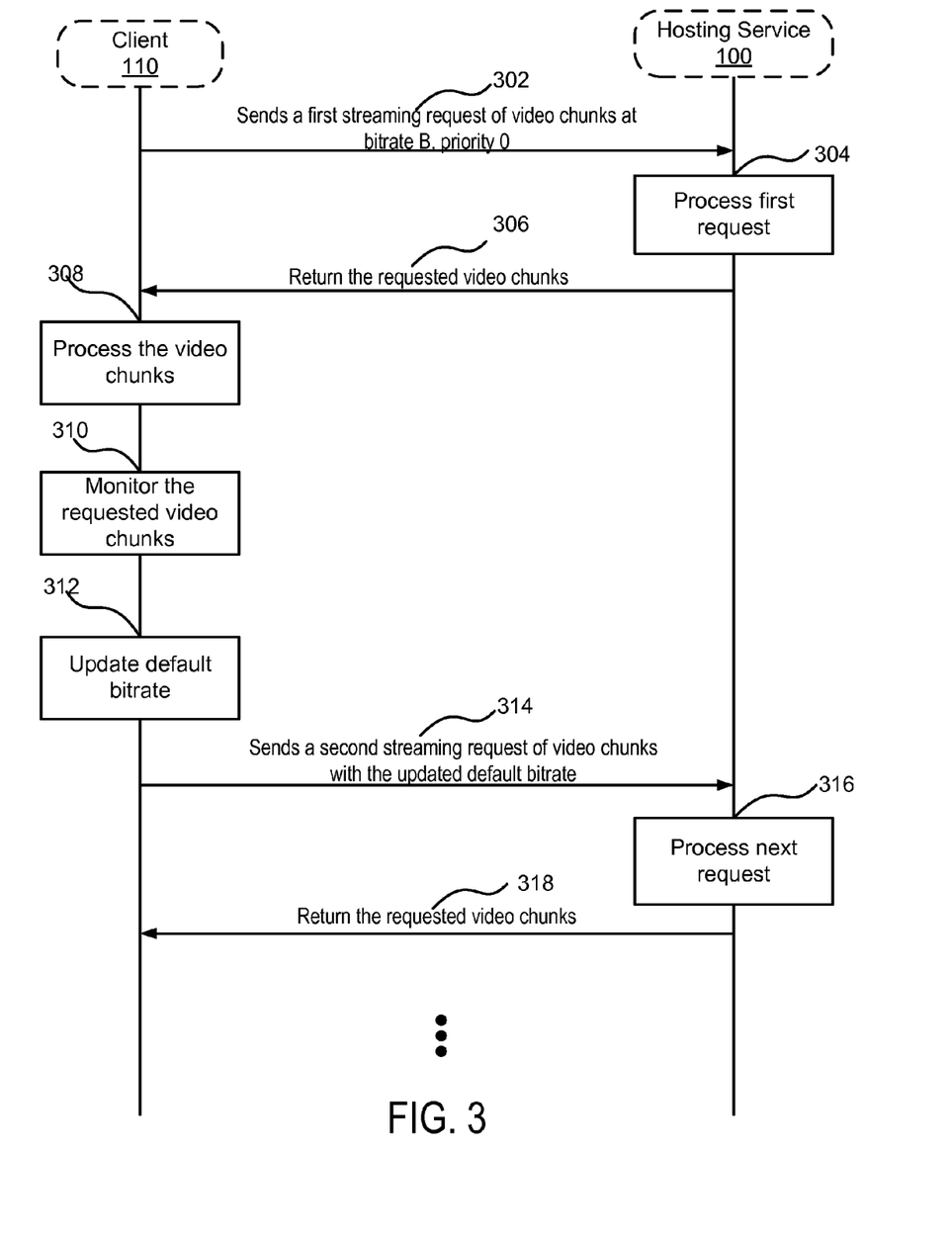
FIG. 3 is an interactive flow chart of adaptive video streaming according to one embodiment of the invention.

FIG. 3 is an interactive flow chart of adaptive video streaming according to one embodiment of the invention. Other embodiments may have different steps and different order of the steps. Initially, the adaptive streaming module 120 executed at the client 110 sends 302 a first video streaming request for one or more video chunks at bitrate B and priority 0 to the video hosting service 100. Here, bitrate B represents low quality and priority 0 represents high priority. Bitrate B is set to be the default bitrate. The adaptive video streaming service module 102 of the video hosting service 100 processes 304 the first video streaming request. The processing includes obtaining the streaming parameters (e.g., bitrate and priority) associated with each video chunk of the first video streaming request and retrieving the requested video data from the video server 104. The adaptive video streaming service module 102 returns 306 the processed video chunks to the client 110.

In response to receiving at least one of the requested video chunks, the adaptive streaming module 120 at the client 110 processes 308 the received video chunks. The processing steps include arranging the video chunks into a video stream according to their playing back orders. For a video streaming request, the adaptive streaming module 120 also monitors 310 the video chunks of the request, such as the current download rate, the bitrate and priority of each video chunk. Based on the monitoring result, the adaptive streaming module 120 determines whether the network can support streaming subsequent video chunks with a higher bitrate or concurrent video streaming requests. For example, if the monitoring result indicates that the network can support a subsequent video chunk with a higher bitrate than the current one, the adaptive streaming module 120 updates 312 the default bitrate by setting the higher bitrate as the default rate.

The adaptive streaming module 120 sends 314 a second streaming request of video chunks with the update default bitrate to the video hosting service 100, which processes 316 the request and returns 318 the requested video chunks to the client 110. The interactions between the client 110 and the video hosting service 100 are repeated for the subsequent video streaming requests until all the video chunks of the requested video have been streamed to the client 110.

Figure 5:
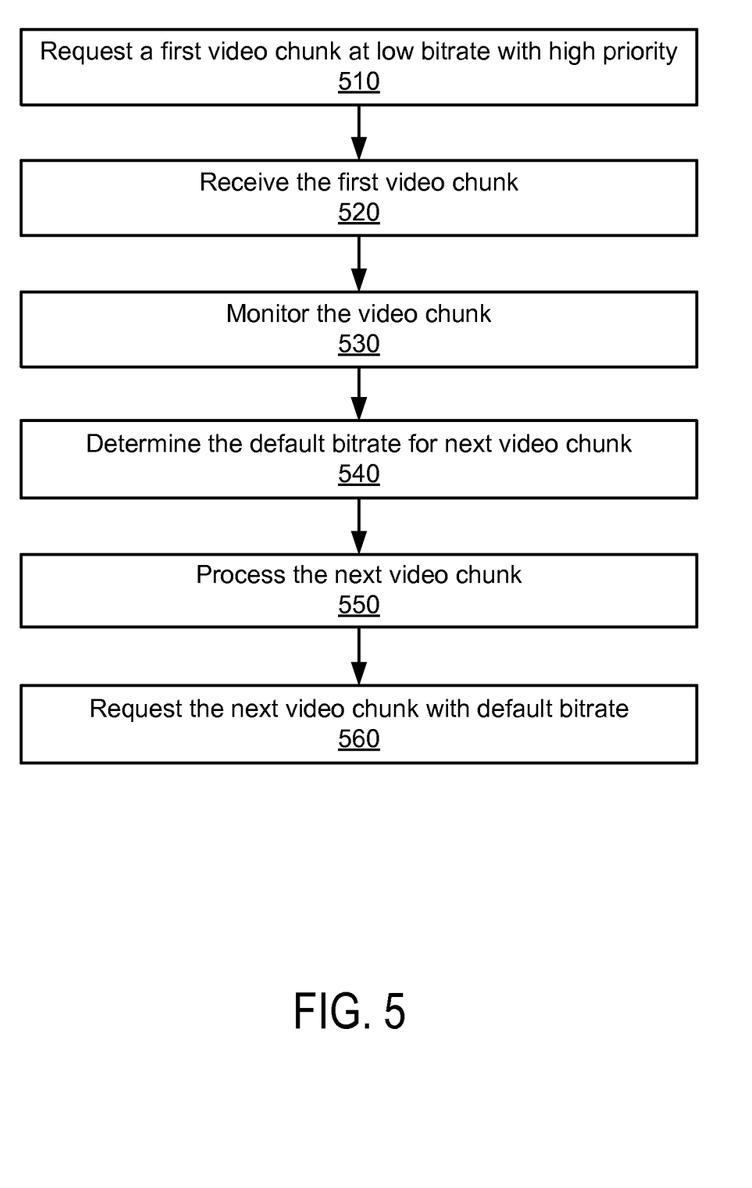
FIG. 5 is a flow chart of adaptive video streaming according to one embodiment of the invention.

FIG. 5 is a flow chart of adaptive video streaming according to one embodiment of the invention. Initially, the client 110 requests 510 a first video chunk at low bitrate with high priority because it is the start of the adaptive video streaming. In response to receiving 520 the requested video chunk, the client 110 monitors 530 the video chunk, including checking the current download rate for the first video chunk and comparing the current download rate with a predetermined download rate threshold value. Based on the monitoring result, the client 110 determines 540 whether to update the default bitrate. If the network supports higher bitrate video streaming, the client determines which video chunk to be streamed with the higher bitrate. The client 110 processes 550 (e.g., assigns the higher bitrate to the next video chunk) and requests 560 the determined video chunk with the updated default bitrate.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of a method. It should be noted that the process steps and instructions of the invention can be embodied in software, firmware or hardware, and when embodied in software, can be downloaded to reside on and be operated from different platforms used by a variety of operating systems.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein, and any references below to specific languages are provided for disclosure of enablement and best mode of the invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention.

We claim:

1. A computer method for adaptively streaming a video over a content delivery network, comprising:
    requesting a first chunk of the video via a network channel of the content delivery network, the request for the first chunk specifying a first bitrate and a first service request priority;
    requesting a second chunk of the video via the network channel of the content delivery network, the request for the second chunk specifying a second bitrate different than the first bitrate and a second service request priority different than the first service request priority;
    monitoring concurrent downloading via the network channel of the first and second video chunks from the content delivery network;
    determining, based on the monitoring, whether the concurrent downloading of the second video chunk at the second bitrate and second service request priority is supported by the network channel of the content delivery network; and
    responsive to determining that the concurrent downloading of the second video chunk at the second bitrate and second service request priority is not supported by the network channel of the content delivery network:
        stopping the concurrent downloading of the second video chunk at the specified second bitrate and second service request priority; and
        requesting the second chunk of the video via the network channel of the content delivery network at the first bitrate and first service request priority.

2. The method of claim 1, wherein determining whether the concurrent downloading of the second video chunk at the second bitrate and second service request priority is supported by the network channel comprises:
    comparing a download bitrate associated with the first video chunk with a download rate threshold value for the first video chunk.

3. The method of claim 2, further comprising:
    responsive to the comparing indicating that the download bitrate associated with the first video chunk does not exceed the download rate threshold value for the first video chunk, establishing the first bitrate as the default bitrate for the video.

4. The method of claim 2, further comprising:
    responsive to the comparing indicating that the download bitrate associated with the first video chunk does exceed the download rate threshold value for the first video chunk, determining that the concurrent downloading of the second video chunk at the second bitrate is supported by the network channel of the content delivery network; and
    establishing the second bitrate as the default bitrate for the video.

5. The method of claim 1, wherein the second bitrate is higher than the first bitrate.

6. The method of claim 1, further comprising:
    downloading the first and second chunks of the video in parallel on a same network channel of the content delivery network.

7. The method of claim 1, wherein the request for the first chunk and the request for the second chunk are sent over a same network channel to a same computer server.

8. A non-transitory computer-readable storage medium storing executable computer program instructions for adaptively streaming a video over a content delivery network, the computer program instructions comprising instructions for:
    requesting a first chunk of the video via a network channel of the content delivery network, the request for the first chunk specifying a first bitrate and a first service request priority;
    requesting a second chunk of the video via the network channel of the content delivery network, the request for the second chunk specifying a second bitrate different than the first bitrate and a second service request priority different than the first service request priority;
    monitoring concurrent downloading via the network channel of the first and second video chunks from the content delivery network;
    determining, based on the monitoring, whether the concurrent downloading of the second video chunk at the second bitrate and second service request priority is supported by the network channel of the content delivery network; and
    responsive to determining that the concurrent downloading of the second video chunk at the second bitrate and second service request priority is not supported by the network channel of the content delivery network:
        stopping the concurrent downloading of the second video chunk at the specified second bitrate and second service request priority; and
        requesting the second chunk of the video via the network channel of the content delivery network at the first bitrate and first service request priority.

9. The computer-readable storage medium of claim 8, wherein determining whether the concurrent downloading of the second video chunk at the second bitrate and second service request priority is supported by the network channel comprises:
    comparing a download bitrate associated with the first video chunk with a download rate threshold value value for the first video chunk.

10. The computer-readable storage medium of claim 9, further comprising instructions for:
    responsive to the comparing indicating that the download bitrate associated with the first video chunk does not exceed the download rate threshold value for the first video chunk, establishing the first bitrate as the default bitrate for the video.

11. The computer-readable storage medium of claim 9, further comprising instructions for:
    responsive to the comparing indicating that the download bitrate associated with the first video chunk does exceed the download rate threshold value for the first video chunk, determining that the concurrent downloading of the second video chunk at the second bitrate is supported by the network channel of the content delivery network; and
    establishing the second bitrate as the default bitrate for the video.

12. The computer-readable storage medium of claim 8, wherein the second bitrate is higher than the first bitrate.

13. The computer-readable storage medium of claim 8, further comprising instructions for:
    downloading the first and second chunks of the video in parallel on a same network channel of the content delivery network.

14. A system for adaptively streaming a video over a content delivery network, comprising:
    a non-transitory computer-readable storage medium storing executable computer modules, comprising:
        a streaming request module for:
            requesting a first chunk of the video via a network channel of the content delivery network, the request for the first chunk specifying a first bitrate and a first service request priority;
  requesting a second chunk of the video via the network channel of the content delivery network, the request for the second chunk specifying a second bitrate different than the first bitrate and a second service request priority different than the first service request priority; and
a streaming monitoring module for:
  monitoring concurrent downloading via the network channel of the first and second video chunks from the content delivery network;
  determining, based on the monitoring, whether the concurrent downloading of the second video chunk at the second bitrate and second service request priority is supported by the network channel of the content delivery network; and
  responsive to determining that the concurrent downloading of the second video chunk at the second bitrate and second service request priority is not supported by the network channel of the content delivery network:
    stopping the concurrent downloading of the second video chunk at specified second bitrate and second service request priority; and
    requesting the second chunk of the video via the network channel of the content delivery network at the first bitrate and first service request priority; and
a computer processor configured to execute the computer modules.

15. The system of claim 14, wherein the streaming monitoring module is further for:
  comparing a download bitrate associated with the first video chunk with a download rate threshold value for the first video chunk.

* * * * *